United States Patent
Khalid et al.

(10) Patent No.: US 12,425,102 B2
(45) Date of Patent: Sep. 23, 2025

(54) HYBRID OPTICAL TRANSMITTER FOR HIGH SPEED OPTICAL WIRELESS COMMUNICATION

(71) Applicant: SIGNIFY HOLDING B.V., Eindhoven (NL)

(72) Inventors: Amir Masood Khalid, Eindhoven (NL); Christian Jordan, Venlo (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 206 days.

(21) Appl. No.: 18/034,942

(22) PCT Filed: Nov. 9, 2021

(86) PCT No.: PCT/EP2021/081141
§ 371 (c)(1),
(2) Date: May 2, 2023

(87) PCT Pub. No.: WO2022/101217
PCT Pub. Date: May 19, 2022

(65) Prior Publication Data
US 2024/0022325 A1     Jan. 18, 2024

(30) Foreign Application Priority Data
Nov. 13, 2020 (EP) .................................. 20207389

(51) Int. Cl.
*H04B 10/112* (2013.01)
*H04B 10/116* (2013.01)

(52) U.S. Cl.
CPC ....... *H04B 10/1123* (2013.01); *H04B 10/116* (2013.01)

(58) Field of Classification Search
CPC ........................ H04B 10/1123; H04B 10/116
(Continued)

(56) References Cited

U.S. PATENT DOCUMENTS

2019/0082520 A1* 3/2019 Noshad ............ H04B 10/25752
2020/0366372 A1* 11/2020 Tsonev ................. H04B 10/116
(Continued)

FOREIGN PATENT DOCUMENTS

CN     108833015 A     11/2018
GB     2568659 A       5/2019
(Continued)

OTHER PUBLICATIONS

Marraccini Philip J et al., "Smart multiple-mode indoor optical wireless design and multimode light source smart energy-efficient links", Optical Engineering, Soc. of Photo-Optical Instrumentation Engineers, Bellingham, vol. 52, No. 5, May 1, 2013 (May 1, 2013), p. 55001, XP060025822, ISSN: 0091-3286, DOI: 10.1117/1.OE.52.5.055001.

*Primary Examiner* — Dalzid E Singh (57) ABSTRACT

To satisfy the application requirement to meet a high data rate and obtain a large coverage in an optical wireless communication system, an optical wireless communication, OWC, transmitter (100) is disclosed in the present invention. The OWC transmitter (100) comprises a first light source (150) configured to emit a first optical data signal (151) in a first field-of-view, FoV (155); and a second light source (160) configured to emit a second optical data signal (161) in a second FoV (165). The first light source (150) and the second light source (160) are of different types, and the first FoV (155) is wider than the second FoV (165). The OWC transmitter (100) is configured to emit the first optical data signal (151) via the first light source (150) and to emit the second optical data signal (161) via the second light source (160) simultaneously.

13 Claims, 5 Drawing Sheets

(58) Field of Classification Search
USPC .......................................................... 398/115
See application file for complete search history.

(56) References Cited

U.S. PATENT DOCUMENTS

2021/0194585 A1* 6/2021 Afgani ................... H04B 10/60
2022/0166506 A1* 5/2022 Carraro ................ H04B 10/116

FOREIGN PATENT DOCUMENTS

WO      2017145207 A1    8/2017
WO      2019077315 A1    4/2019

* cited by examiner

HYBRID OPTICAL TRANSMITTER FOR HIGH SPEED OPTICAL WIRELESS COMMUNICATION

CROSS-REFERENCE TO PRIOR APPLICATIONS

This application is the U.S. National Phase application under 35 U.S.C. § 371 of International Application No. PCT/EP2021/081141, filed on Nov. 9, 2021, which claims the benefit of European Patent Application No. 20207389.6, filed on Nov. 13, 2020. These applications are hereby incorporated by reference herein.

FIELD OF THE INVENTION

The invention relates to the field of optical wireless communication networks, such as Li-Fi networks. More particularly, various methods, apparatus, systems, and computer-readable media are disclosed herein related to a system with a hybrid optical transmitter to support high speed optical wireless communication.

BACKGROUND OF THE INVENTION

To enable more and more electronic devices like laptops, tablets, and smartphones to connect wirelessly to the Internet, wireless communication confronts unprecedented requirements on data rates and also link qualities, and such requirements keep on growing year over year, considering the emerging digital revolution related to Internet-of-Things (IoT). Radio frequency technology like Wi-Fi has limited spectrum capacity to embrace this revolution. In the meanwhile, light fidelity (Li-Fi) is drawing more and more attention with its intrinsic security enhancement and capability to support higher data rates over the available bandwidth in visible light, Ultraviolet (UV), and Infrared (IR) spectra. Furthermore, Li-Fi is directional and shielded by light blocking materials, which provides it with the potential to deploy a larger number of access points, as compared to Wi-Fi, in a dense area of users by spatially reusing the same bandwidth. These key advantages over wireless radio frequency communication make Li-Fi a promising secure solution to mitigate the pressure on the crowded radio spectrum for IoT applications and indoor wireless access. Other possible benefits of Li-Fi include guaranteed bandwidth for a certain user, and the ability to function safely in areas otherwise susceptible to electromagnetic interference. Therefore, Li-Fi is a very promising technology to enable the next generation of immersive connectivity.

There are several related terminologies in the area of lighting-based communication. Visible-light communication (VLC) transmits data by intensity modulating optical sources, such as light emitting diodes (LEDs) and laser diodes (LDs), faster than the persistence of the human eye. VLC is often used to embed a signal in the light emitted by an illumination source such as an everyday luminaire, e.g. room lighting or outdoor lighting, thus allowing use of the illumination from the luminaires as a carrier of information. The light may thus comprise both a visible illumination contribution for illuminating a target environment such as a room (typically the primary purpose of the light), and an embedded signal for providing information into the environment (typically considered a secondary function of the light). In such cases, the modulation may typically be performed at a high enough frequency to be beyond human perception, or at least such that any visible temporal light artefacts (e.g. flicker and/or strobe artefacts) are weak enough and at sufficiently high frequencies not to be noticeable or at least to be tolerable to humans. Thus, the embedded signal does not affect the primary illumination function, i.e., so the user only perceives the overall illumination and not the effect of the data being modulated into that illumination.

For wireless optical communication at high speed, often Infrared (IR) rather than visible light communication is used. Although the ultraviolet and infrared radiation is not visible to the human eye, the technology for utilizing these regions of the spectra is the same, while variations may occur as a result of wavelength dependencies, such as in the case of refractive indices. In many instances there are advantages to using ultraviolet and/or infrared as these frequency ranges are not visible to the human eye, and more flexibility can be introduced in the system. Of course, ultraviolet quanta have higher energy levels compared to those of infrared and/or visible light, which in turn may render use of ultraviolet light undesirable in certain circumstances.

Based on the modulations, the information in the light can be detected using any suitable light sensor or photodetector. For example, the light sensor may be a photodiode. The light sensor may be a dedicated photocell (point detector), an array of photocells possibly with a lens, reflector, diffuser, or phosphor converter (for lower speeds), or an array of photocells (pixels) and a lens for forming an image on the array. E.g., the light sensor may be a dedicated photocell included in a dongle which plugs into a user device such as a smartphone, tablet or laptop, or the sensor may be integrated and or dual-purpose, such as an array of infrared detectors initially designed for 3D face recognition. Either way this may enable an application running on the user device to receive data via the light.

Although a Li-Fi system has the potential to support very high data rate with its un-licensed bandwidth in the range of THz, currently commercially achievable bit rates are typically in the range of few hundreds of Mbps using spectral efficient modulations e.g., OFDM, due to the low intrinsic bandwidth (10-20 MHz) of LEDs (either visible or IR). Furthermore, it is quite appealing to have a Li-Fi system support a large coverage (e.g. 30-60 degrees according to the function of full width at half maximum (FWHM)). However, the large coverage requirement typically results in significant reduction in received optical power (high path loss, keeping the TX power under eye-safety limit), and hence it may further limit the overall throughput. On the other hand, laser, or vertical-cavity surface-emitting laser (VCSEL) based Li-Fi systems can support large modulation bandwidth. But due to the eye safety, the total amount of power emitted by laser/VCSEL is quite limited, and thus large coverage is still difficult to achieve.

GB2568659A is related to an optical wireless communication transmitter which includes a media access control (MAC) layer and two different physical (PHY) layers. Each of the PHY layers drives a respective different light source.

MARRACCINI PHILIP J ET AL "Smart multiple-mode indoor optical wireless design and multimode light source smart energy-efficient links" is related to a smart multiple-mode indoor optical wireless system that combines line-of-sight (LOS) and non-LOS optical wireless methods to smartly adapt to changes in environment and application.

SUMMARY OF THE INVENTION

The performance of an optical wireless communication link is greatly dependent on the optical front end, or the light source at the transmitter side. For example, in a LED based optical wireless communication system, low to medium data rates can be achieved with a relatively large Field of View (FoV) and long communication distance. In a laser/VCSEL based optical wireless communication system, higher data rates can be achieved with a relatively small coverage (narrow beam) and short communication distance.

To leverage the benefits of different light sources, inventors propose to deploy a transmitter with a hybrid optical front end comprising at least two different light sources. As an example, with a hybrid of LED and VCSEL, the transmitter can provide a high data rate in the LED and VCSEL overlapping zone and a moderate data rate in the LED only coverage zone. However, due to the difference in response time between the different light sources, the co-located different light sources may result in interference to each other at a receiver side and compromise the communication performance.

In view of the above, the present disclosure is directed to methods, apparatus, and systems for providing a hybrid transmitter to achieve both high speed and large coverage. More particularly, the goal of this invention is achieved by an optical wireless communication (OWC) transmitter as claimed in claim 1, by an OWC system as claimed in claim 9, by a method of an OWC transmitter as claimed in claim 10, and by a computer program as claimed in claim 13.

In accordance with a first aspect of the invention an OWC transmitter is provided. An OWC transmitter comprises a first light source configured to emit a first optical data signal in a first field-of-view, FoV; and a second light source configured to emit a second optical data signal in a second FoV; wherein the first light source and the second light source are of different types, and the first FoV is wider than the second FoV; and the optical wireless communication transmitter is further configured to emit the first optical data signal via the first light source and to emit the second optical data signal via the second light source simultaneously.

The OWC transmitter characterized in that OWC transmitter is further configured to compensate a difference in response time between the first light source and the second light source. The response time may be either measured locally at the OWC transmitter side or obtained from a remote OWC receiver via a feedback loop.

There are different types of light sources, such as a light-emitting diode (LED), a laser, a VCSEL (vertical-cavity surface-emitting laser), a VCSEL array, a laser diode, or an LEP (light-emitting plasma). The disclosed OWC transmitter comprises at least two different light sources. The difference between the two light sources may lie in power consumption, coverage, maximum output power, response time or signal bandwidth. As mentioned before, a LED based optical wireless communication system is characterized by a relatively long communication distance and large FoV/coverage area, but low to mediate data rates, while a VCSEL based optical wireless communication system is characterized by high data rates, but a relatively small angular coverage with a narrow FoV.

To boost the data rate of the transmitter, the two heterogeneous light sources are configured to transmit simultaneously. It should be noted that the two light sources are emitting substantially simultaneously. Since the two light sources may support different data rates, when the same amount of information is to be transmitted, the two light sources may start the transmission substantially simultaneously, but one may finish earlier than the other due to the difference on transmission speeds or data rates.

In a preferred configuration, the second light source supports a larger bandwidth than the first light source.

With a larger bandwidth of the second light source, a higher data rate can be supported. In that sense, the second light source is of higher performance than the first light source. Typically, it also indicates that the second light source may consume higher power consumption. However, since the second light source needs less time to transmit the same amount of data as compared to the first light source and the FoV is smaller, the energy consumed to send a certain amount of data may be comparable or even less.

Beneficially, the first optical data signal and the second optical data signal are from a common data stream provided to the OWC transmitter.

To achieve both high speed and large coverage, it is beneficial to generate the first optical data signal and the second optical data signal from a common data stream. Thus, the same raw data is provided to a first transmitter chain with the first light source and a second transmitter chain with the second light source. Since the first light source has a narrower bandwidth as compared to the second light source, a low resolution or compressed version of the data stream may be transmitted by the first light source, while the complete information may be delivered by the second light source. When the data rate of the first light source is sufficient to support the throughput of the data stream, identical information may be transmitted by both light sources. It may also be configured that the first light source and the second light source transmit the same raw data in a collective manner, such that different portions or frequency components of the same data are transmitted via the two light sources respectively.

With the common data stream provided to the OWC transmitter, with a first option, the first optical data signal comprises a lower frequency portion of the common data stream, and the second optical data signal comprises a higher frequency portion of the common data stream.

To avoid interference between the two concurrent optical links via the first light source and the second light source, the common data stream is split into a lower frequency portion and a higher frequency portion, and delivered as the first optical data signal and the second optical data signal, respectively. Preferably, the bandwidth of the lower frequency portion of the common data stream matches the bandwidth of the first light source to maximize the throughput of the first light source. Thus, the split is made to keep the higher frequency portion of the common data stream having a larger bandwidth than the lower frequency portion.

With this option, although the first optical data signal and the second optical data signal originate from the common data stream, different frequency components of the same data source are transmitted via the first light source and the second light source. Hence, the first light source and the second light source are operated in a Frequency Division Multiplexing (FDM) mode.

With the common data stream provided to the OWC transmitter, with a second option, the first optical data signal and the second optical data signal are overlapping in frequency, such that information contained in the first optical data signal is fully comprised in the second optical data signal.

To further improve the throughput, it is more favorable to share the same frequency band by both the first light source and the second light source. Thus, the frequency of the first optical data signal is fully covered by the frequency of the second optical data signal. With this setup, it is important to keep the emitted light via the first light source and the second light source arrives at a remote receiver side synchronously.

In this option, two versions of the same signal, a low-resolution one and a high-resolution one, are transmitted via the first light source and the second light source respectively. Since the first light source has a wider FoV than the second light source, by sending the low-resolution signal via the first light source the coverage of the OWC transmitter is extended. Therefore, when a remote receiver is located within the FoV of the second light source, it can enjoy the full details of the signal. When it moves out of that region but within the FoV of the first light source, it can still obtain the signal with a lower resolution.

With the second option, it is advantageous that the OWC transmitter is further configured to compensate a difference in response time between the first light source and the second light source.

Since signals can be controlled precisely in the time domain in the electrical part of the transmitter, the first optical data signal and the second optical data signal may arrive at the two optical front ends substantively simultaneously. Additional latency may be added to the emitted signal in the optical part of the transmitter, such as the difference in response time between the first light source and the second light source.

The response time, or delay response, of the different light sources may differ quite a lot. For example, for a LED, the response time may be up to 10-20 ns, while for a VCSEL the response time may be less than 1 ns. Such difference in response time may result in a phase shift between the signals transmitted via the two light sources, and at a remote receiver side such phase shift may introduce destructive interference to each other and degrade the communication performance. Therefore, it is preferably to compensate the difference in response time between the first light source and the second light source to allow the remote receiver to receive the two branches of signals in a constructive manner to further improve the signal-to-noise ratio (SNR).

To derive the difference in response time, the OWC transmitter preferably further comprises a sniffer circuit to measure response time of the first light source, and the OWC transmitter is further configured to compensate the difference in response time by adding an extra delay to a signal path from the common data stream to the second light source according to the measured response time of the first light source.

One scheme to derive the difference in response time is to measure the response time of the slower light source, which is the first light source, directly. The measurement is done via the sniffer circuit. And then, an additional delay that equates to the response time of the slower light source is introduced to the transmitter chain comprising the fast light source, the second light source, purposely. The assumption here is that the response time of the second light source is small enough to be neglected as compared to the response time of the first light source. This scheme can be carried out locally in the OWC transmitter.

As an alternative approach to derive the difference in response time, the OWC transmitter is further configured to carry out the following steps before sending the first optical data signal and the second optical data signal: send a test signal via the first light source and via the second light source respectively to a remote OWC receiver; receive a response signal from the remote OWC receiver, wherein the response signal comprises a feedback on channel state information, CSI, derived from the test signals sent by the first light source and the second light source respectively; determine the difference in response time between the first light source and the second light source based on the response signal; and compensate the difference in response time by adding an extra delay to a signal path from the common data stream to the second light source according to the determined difference in response time.

In this scheme, the difference in response time is obtained by the OWC transmitter via a feedback loop from a remote OWC receiver. A test signal is sent by the OWC transmitter via the first light source and via the second light source respectively to the remote OWC receiver, which calculates channel state information (CSI) based on the received test signal. CSI provides both the phase and amplitude information about an incoming signal. Therefore, the phase shift introduced at the transmitter side by the two different light sources to the same test signal is also reflected in the CSI calculated by the remote OWC receiver. The remote OWC receiver sends back a response signal comprising the CSI to the OWC transmitter. And then, the transmitter is able to obtain the difference in response time, which is used to apply purposely a delay to the signal path from the common data source to the second light source. In this manner, the emitted light signals via the first light source and the second light source are phase aligned for data communication.

The response signal from the remote OWC receiver may be sent via another wireless link rather than an OWC link. The other wireless link may be according to a short-range wireless communication protocol, such as Wi-Fi, Zigbee, or BLE. The response signal may also be sent via an OWC link. And then, a bidirectional OWC link is enabled by the OWC transmitter and the remote OWC receiver, in which case both sides are OWC transceivers.

Such a procedure may be repeated each time for establishing a new OWC link with a new remote receiver, and it is preferably carried out purely as an initialization stage before the data communication actually starts.

In a preferred setup, the first light source comprises at least one light-emitting diode (LED) and the second light source comprises at least one of: a laser, a vertical-cavity surface-emitting laser (VCSEL).

To maximize the benefit of employing such two heterogeneous light sources within the same OWC transmitter, it is advantageous that the two light sources present significantly different properties. For example, one light source may be good at its large coverage, while another light source may be suitable for higher data rates. The combination of a LED and a VCSEL may be a good candidate to deploy in an OWC transmitter.

In accordance with a second aspect of the invention an OWC system is provided. An OWC system comprises an OWC transmitter according to the present invention; and a remote OWC receiver comprising at least one light sensor, and wherein the at least one light sensor is configured to receive at least one of the first optical data signal and the second optical data signal sent by the OWC transmitter.

In accordance with a third aspect of the invention a method of an OWC transmitter is provided. A method of an OWC transmitter comprises the steps of: emitting a first optical data signal via a first light source in a first field-of-view, FoV; and emitting a second optical data signal via a second light source in a second FoV; emitting the first optical data signal via the first light source and emitting the second optical data signal via the second light source simultaneously; and wherein the first light source and the second light source are of different types, and the first FoV is wider than the second FoV.

The method is characterized in that the method further comprises a step of compensating a difference in response time between the first light source and the second light source.

As one example to derive the difference in response time, the method further comprises the steps of: measuring response time of the first light source; compensating for the difference in response time by adding an extra delay to a signal path to the second light source according to the measured response time of the first light source.

As another example to derive the difference in response time, the method further comprises the steps of: sending a test signal via the first light source and via the second light source respectively; receiving a response signal, which comprises a feedback on channel state information, CSI, derived from the test signal; determining the difference in response time between the first light source and the second light source based on the response signal; compensating for the difference in response time by adding an extra delay to a signal path to the second light source according to the determined difference in response time.

The invention may further be embodied in a computing program comprising code means which, when the program is executed by an optical front-end subsystem comprising processing means, cause the processing means to perform the method of the optical front-end subsystem as disclosed in the present invention.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

Figure 1:
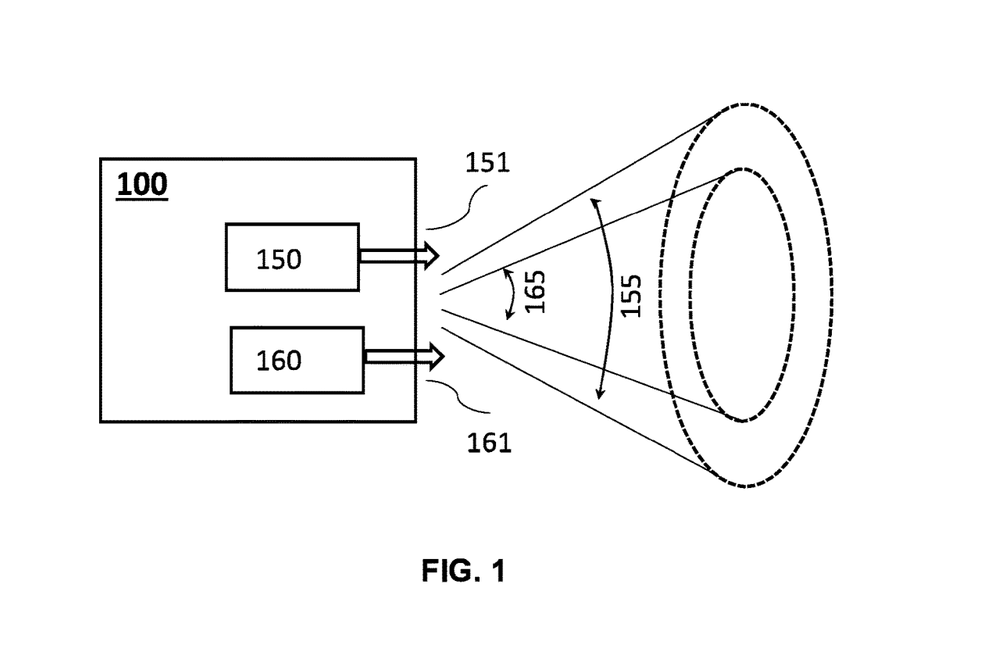
FIG. 1 illustrates a basic block diagram of the OWC transmitter of the present invention.

Various embodiments of the present invention will now be described based on an optical wireless communication (OWC) transmitter 100 as shown in FIG. 1. As a basic setup, the OWC transmitter 100 comprises a first light source 150 and a second light source 160. The first light source 150 is configured to emit a first optical data signal 151 in a first field-of-view (FoV) 155, and the second light source 160 is configured to emit a second optical data signal 161 in a second FoV 165. The first FoV 155 is wider than the second FoV 165. As exemplarily shown in FIG. 1, it may be beneficial to have the second FoV 165 fully covered by the first FoV 155. And it may be even more beneficial to have the first FoV 155 and second FoV 165 centered at the same point. Alternatively, the first FoV 155 and second FoV 165 are directed to different areas with partial or no overlap. The OWC transmitter 100 is further configured to emit the first optical data signal 151 and the second optical data signal 161 simultaneously.

FoV here is understood to be the solid angle originating from the light source in three-dimensional space, where light from the light source may be perceived. The shape of the solid angle may be shaped using further optical means, such as but not limited to lenses, gratings, diaphragms and/or collimators. Another term used in conjunction with the light source is coverage area, coverage area is understood as the area in the three-dimensional space that light from the light-source impinges on.

In a preferred setup, the first light source 150 and the second light source 160 are of different types, and they differ from each other also in other properties other than FoV, such as power consumption, response time, bandwidth, and etc. For example, the second light source 160 may emit optical signals at a higher data rate with a narrower beam as compared to the first light source 150. And on the other hand, the first light source 150 may be able to deliver optical signals at a medium data rate but with a wider coverage and a longer communication distance. For example, the first light source 150 may be a LED based optical transmitter which facilitates a medium to low speed wide beam optical transmitter, and the second light source 160 may be a VCSEL based optical transmitter which facilitates a high-speed narrow beam optical transmitter. Therefore, the disclosed OWC transmitter 100 deploys both the first light source 150 and the second light source 160 in a complementary manner to achieve an improvement in both high throughput and large coverage.

Figure 2:
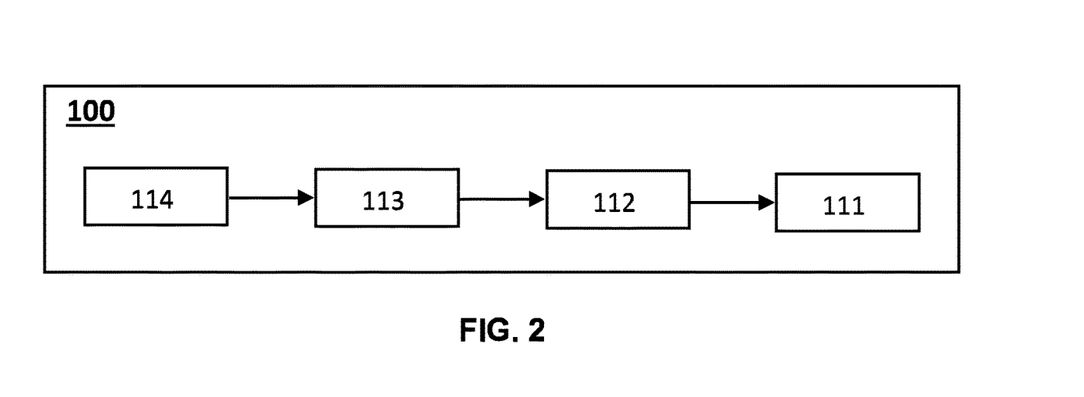
FIG. 2 illustrates one possible system setup of a typical OWC transmitter.

FIG. 2 illustrates one possible system setup of a typical OWC transmitter with a high-level block diagram. On one side, the OWC transmitter has an interface 114 to a backbone network, which can be a wired connection (Ethernet, optical fiber), or a wireless connection (RF, millimeter-wave, or another kind of high-speed optical wireless that is different from the optical wireless communication that the OWC transmitter performs with a remote device. And on the other side, the OWC transmitter has an optical front end 111 to enable an optical link with a remote OWC receiver. Furthermore, the OWC transmitter also implements the translation or conversion between the data on the backbone network and data on an optical wireless link, in terms of conversion between different modulation schemes and conditioning of the analog signals. Therefore, a typical OWC transmitter comprises also a digital modulator and demodulator component 113 and an analog front end 112. In the transmission path, the analog front end (AFE) 112 may comprise a programmable amplifier, a filter, and a driver to condition and amplify the baseband signal to drive the optical front end. The optical front end 111 comprising at least a light source implements the conversion between electrical signals and optical signals. For emitting optical signals, the optical front end 111 is used to convert the electrical transmitting signals to output optical signals via the light source.

Figure 3:
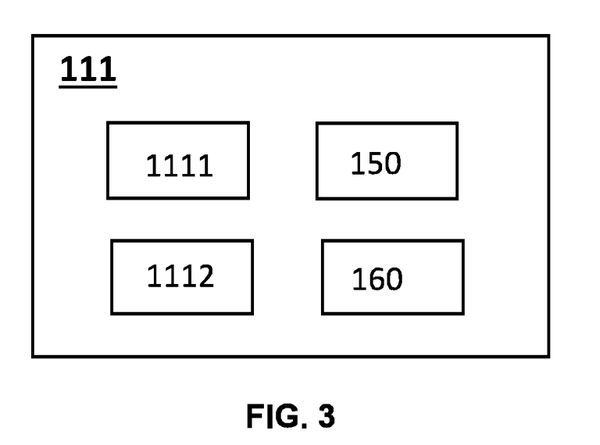
FIG. 3 demonstrates one example of an optical front end of the present invention.

One example of an optical front end 111 according to the present invention is demonstrated in FIG. 3. The optical front end 111 comprises the first light source 150 and the second light source 160. Optionally, the optical front end 111 further comprises a first driver 1111 and a second driver 1112 to drive the first light source 150 and the second light source 160, respectively. The drivers 1111, 1112 are mainly used for regulating the power required for the light sources.

As disclosed above, it may be beneficial to configure the first light source 150 and the second light source 160 to emit optical signals provided from a common data stream And then, the first light source 150 and the second light source 160 are employed to either deliver different portions of the signals from the common data stream 50 or deliver the same signals from the common data stream 50. Given the different bandwidths supported by the two light sources, depending on the actual throughput on the common data stream 50, the same signals may be delivered by the two light source with different resolutions or details, such that the first light source 150 is configured to deliver a compressed low resolution data, while the second light source 160 is configured to deliver the complete data set. And then, when a remote device is within the coverage of the second FoV 165, it can enjoy the high data rate link; and when it moves out of the second FoV 165 but within the first FoV 155, it may still able to receive information from the OWC transmitter 100 with reduced resolution.

To allow the first light source 150 and the second light source 160 make use of the same frequency band to emit the same data, it is necessary to compensate the difference in response time between the two light sources. This is because although timing can be controlled precisely in the electrical part of the OWC transmitter 100 to provide the input data to the first light source 150 and the second light source 160 substantively simultaneously, different delay may be introduced in the optical part by the first light source 150 and the second light source 160 respectively. Due to the different types of light sources, the difference in response time can be relatively big, which results in phase shifts between the first optical data signal 151 and the second optical data signal 161. When the phase mis-aligned first optical data signal 151 and second optical data signal 161 arrives at a remote OWC receiver side, they will introduce destructive interference to each other. Therefore, it is important to compensate the difference in response time between the two light sources to allow the two emitted optical signals are also phase aligned.

Figure 4:
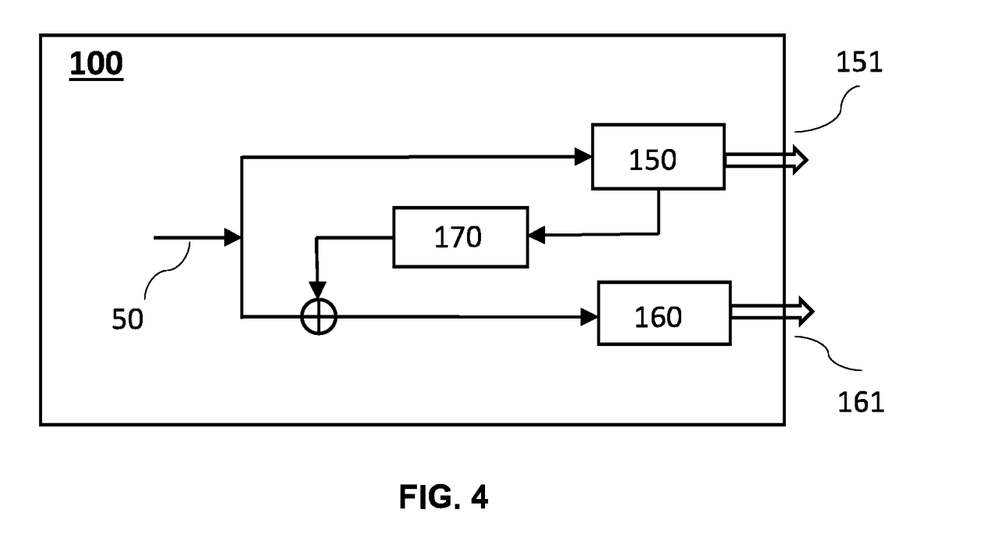
FIG. 4 illustrates one possible system setup of an OWC transmitter of the present invention.
Figure 5:
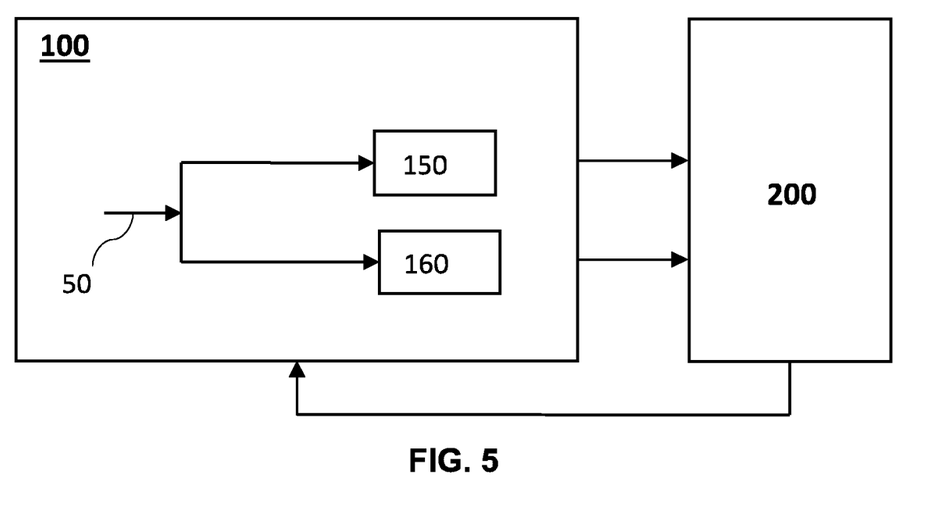
FIG. 5 illustrates another possible system setup of the OWC transmitter of the present invention.

There are two methods to derive the difference in response time, as illustrated in FIG. 4 and FIG. 5, respectively. In FIG. 4, the measurement is carried out locally within the OWC transmitter 100. As shown in the system setup, the OWC transmitter 100 further comprises a sniffer circuit 170, which is used to directly measure the response time of the first light source 150. The optical signal emitted by the first light source 150 is sniffed at the output and converted into electrical domain and fed back to input to the second light source 160 by introducing an additional delay to the signal. Preferably, the delay is applied to the electrical signal before supplying to the driver 1112 that modulates the second light source 160. The assumption here is that the response time of the second light source 160 is sufficiently small as compared to the response time of the first light source 150. And hence, the difference in response time is dominated by the response time of the first light source 150.

FIG. 5 illustrates another possible method to derive the difference in response time between the first light source 150 and the second light source 160, which is implemented via a feedback from a remote OWC receiver 200. This method is triggered by the OWC transmitter 100 by sending a test signal via the first light source 150 and the second light source 160 respectively to the remote OWC receiver 200. Preferably, the first light source 150 and the second light source 160 are configured to send the same test signal sequentially without overlapping time. And hence, the remote OWC receiver 200 can receive the two copies independently, without the concern on destructive interference. Upon receiving the test signals, the remote OWC receiver 200 calculates channel state information (CSI) and sends back the CSI to the OWC transmitter 100 in a response signal. The OWC transmitter 100 can then derive the difference in response time of the two light sources based on the received response signal. An alternative option may be that the remote OWC receiver 200 derives the difference in response time locally and provides that information directly to the OWC transmitter 100 in the response signal.

The response signal may be sent via another wireless communication technology rather than an optical wireless link. The other wireless communication technology may be based on a short-range wireless communication protocol, such as Wi-Fi, Zigbee, BLE, and etc. The information on CSI or the difference in response time comprised in the response signal may be provided to a controller or processor of the OWC transmitter to calculate a delay to be applied to the signal path towards the second light source 160. The delay may then be applied in a digital modulator and demodulator component such as shown in FIG. 2 the component 113, or applied immediate before the signal fed to the second light source as shown in FIG. 4, or applied before the signal is fed to the driver 1112 of the second light source 160.

Alternatively, when the optical link between the OWC transmitter 100 and the remote OWC receiver 200 is a bi-directional optical wireless link, the response signal from the remote OWC receiver 200 to the OWC transmitter 100 may also be sent via the same optical channel.

Figure 6:
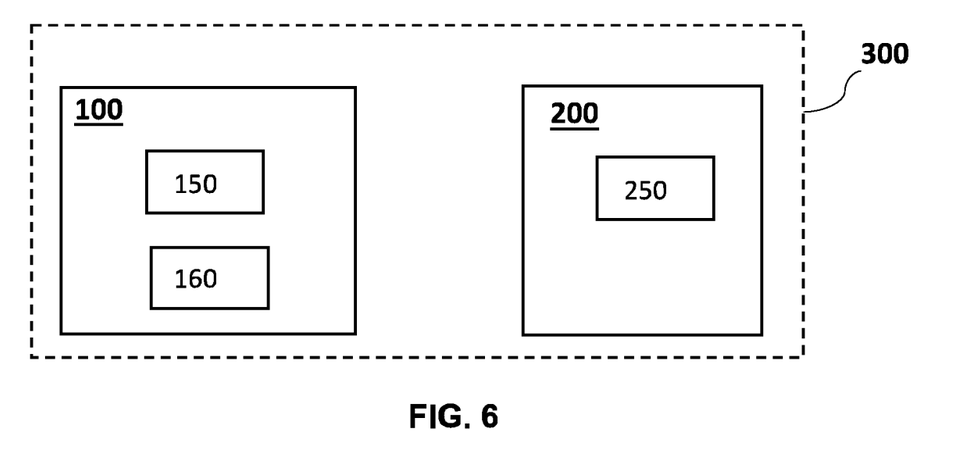
FIG. 6 demonstrates an OWC system of the present invention.

FIG. 6 demonstrates an OWC system 300 comprising the OWC transmitter 100 according to the present invention and a remote OWC receiver 200. The remote OWC receiver 200 comprises at least one light sensor 250, which is suitable for and configured to receive at least one of the first optical data signal and the second optical data signal sent by the OWC transmitter 100. In a preferred example, when the remote OWC receiver 200 is located within the second FoV 165, the light sensor 250 is configured to receive the second optical data signal 161. When the remote OWC receiver 200 is located outside the second FoV 165 but within the first FoV 155, the light sensor 250 is configured to receive the first optical data signal 151.

The light sensor 250 may be a photodiode, a dedicated photocell (point detector), an array of photocells possibly with a lens, reflector, diffuser or phosphor converter (for lower speeds), or an array of photocells (pixels) and a lens for forming an image on the array. It may also be that two different light sensors are deployed in the remote OWC receiver 200 for receiving the first optical data signal 151 and the second optical data signal 161 simultaneously when the remote OWC receiver 200 is located in an overlapping area of the first FoV 155 and the second FoV 165.

Figure 7:
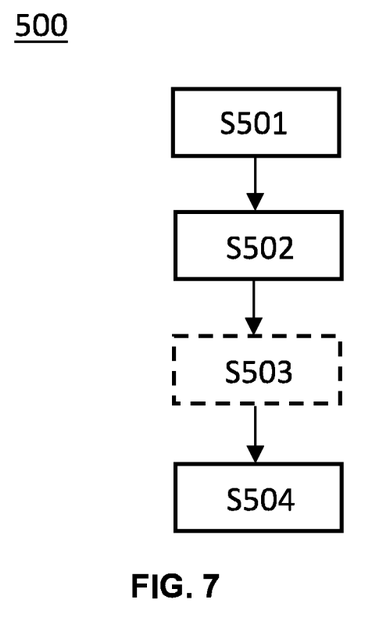
FIG. 7 shows a flow chart of a method of the OWC transmitter.

FIG. 7 shows a flow chart of a method 500 of the OWC transmitter 100. The method 500 comprises the following steps carried out by the OWC transmitter: in step S501, the OWC transmitter 100 emits a first optical data signal 151 via a first light source 150 in a first FoV 155; and in step S502, the OWC transmitter 100 emits a second optical data signal 161 via a second light source 160 in a second FoV 165; the OWC transmitter 100 emits, in step S504, the first optical data signal 151 via the first light source 150 and the second optical data signal 161 via the second light source 160 simultaneously; wherein the first light source 150 and the second light source 160 are of different types, and the first FoV 151 is wider than the second FoV 161. Optionally, the OWC transmitter 100 compensates, in step S503, a difference in response time between the first light source 150 and the second light source 160 before emitting via the two light sources simultaneously.

Figure 8:
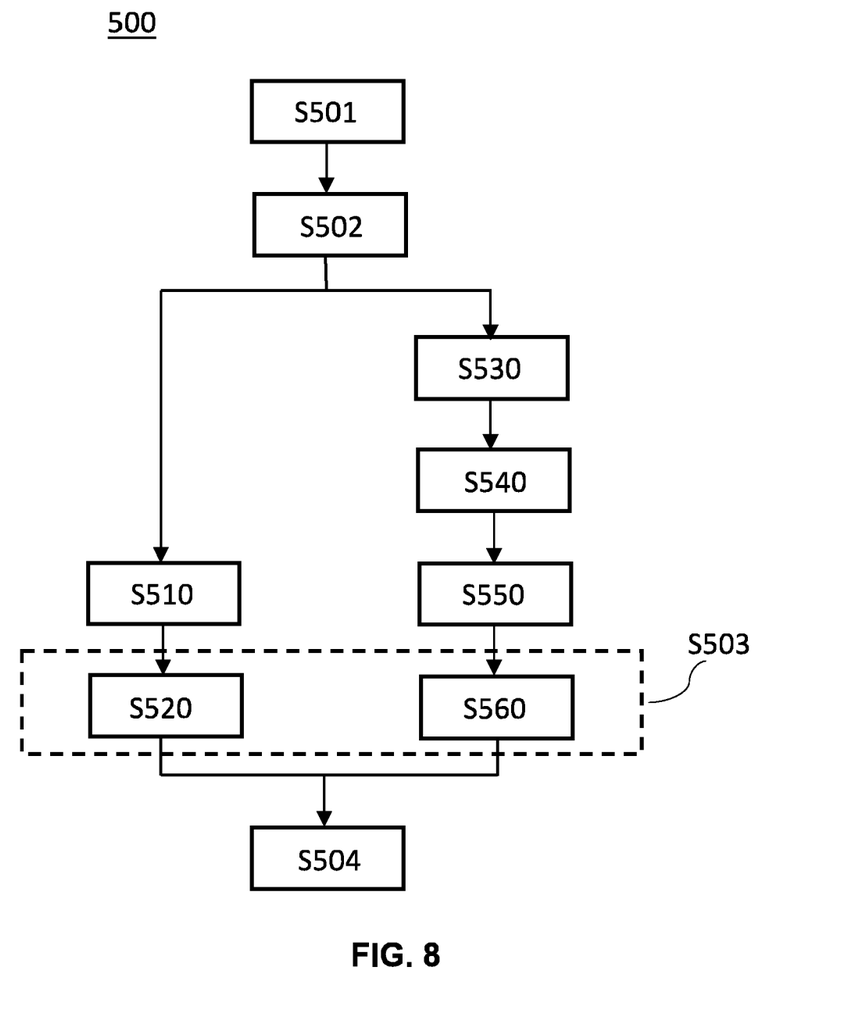
FIG. 8 shows a flow chart of a method of the OWC transmitter.

FIG. 8 shows a flow chart of another implementation of the method 500 of the OWC transmitter 100. Two different options are illustrated to obtain the difference in response time between the first light source 150 and the second light source 160. In the first option, the OWC transmitter 100 measures, in step S510, response time of the first light source 150; and then, in step S520, compensates for the difference in response time by adding an extra delay to a signal path to the second light source 160 according to the measured response time of the first light source 150. In the second option, the OWC transmitter 100 sends, in step S530, a test signal via the first light source 150 and via the second light source 160 respectively; in step S540, the OWC transmitter 100 receives a response signal, which comprises a feedback on channel state information, CSI, derived from the test signal; and then the OWC transmitter 100 determines in step S550 the difference in response time between the first light source 150 and the second light source 160 based on the response signal; and compensates in step S560 for the difference in response time by adding an extra delay to a signal path to the second light source 160 according to the determined difference in response time. Therefore, the step of S503 in FIG. 7 is carried out as either S520 or S560 in FIG. 8.

The methods according to the invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer.

Methods, systems, and computer-readable media (transitory and non-transitory) may also be provided to implement selected aspects of the above-described embodiments.

The term "controller" is used herein generally to describe various apparatus relating to, among other functions, the operation of one or more network devices or coordinators. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, compact disks, optical disks, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The invention claimed is:

1. An optical wireless communication, OWC, transmitter comprising:
    a first light source configured to emit a first optical data signal in a first field-of-view, FoV; and
    a second light source configured to emit a second optical data signal in a second FoV;
    wherein the first light source and the second light source are of different types, and the first FoV is wider than the second FOV;
    and the optical wireless communication transmitter is further configured to emit the first optical data signal via the first light source and to emit the second optical data signal via the second light source simultaneously;
    wherein the OWC transmitter is configured to compensate a difference in response time between the first light source and the second light source.

2. The OWC transmitter according to claim 1, wherein the second light source supports a larger bandwidth than the first light source.

3. The OWC transmitter according to claim 1, wherein the first optical data signal and the second optical data signal are from a common data stream-provided to the OWC transmitter.

4. The OWC transmitter according to claim 3, wherein the first optical data signal comprises a lower frequency portion of the common data stream, and the second optical data signal comprises a higher frequency portion of the common data stream.

5. The OWC transmitter according to claim 3, wherein information contained in the first optical data signal is fully comprised in the second optical data signal.

6. The OWC transmitter according to claim 1, the OWC transmitter further comprises a sniffer circuit to measure response time of the first light source, and the OWC transmitter is further configured to compensate the difference in response time by adding an extra delay to a signal path from the common data stream to the second light source according to the measured response time of the first light source.

7. The OWC transmitter according to claim 1, the OWC transmitter is further configured to carry out the following steps before sending the first optical data signal and the second optical data signal:
    send a test signal via the first light source- and via the second light source respectively to a remote OWC receiver;
    receive a response signal from the remote OWC receiver, wherein the response signal comprises a feedback on channel state information, CSI, derived from the test signals sent by the first light source and the second light source respectively;
    determine the difference in response time between the first light source and the second light source based on the response signal; and compensate the difference in response time by adding an extra delay to a signal path from the common data stream to the second light source according to the determined difference in response time.

8. The OWC transmitter according to claim 1, wherein the first light source comprises at least one light-emitting diode and the second light source comprises at least one of: a laser, a vertical-cavity surface-emitting laser.

9. An optical wireless communication, OWC, system comprising:
an OWC transmitter according to claim 1; and
a remote OWC receiver comprising at least one light sensor, and wherein the at least one light sensor is configured to receive at least one of the first optical data signal and the second optical data signal sent by the OWC transmitter.

10. A method of an optical wireless communication, OWC, transmitter, the method comprising:
emitting a first optical data signal via a first light source in a first field-of-view, FoV; and
emitting a second optical data signal via a second light source in a second FoV;
emitting the first optical data signal via the first light source and emitting the second optical data signal via the second light source simultaneously;
wherein the first light source and the second light source are of different types, and the first FoV-is wider than the second FoV; and compensating a difference in response time between the first light source and the second light source.

11. The method according to claim 10, the method further comprising:
measuring response time of the first light source; and
compensating for the difference in response time by adding an extra delay to a signal path to the second light source according to the measured response time of the first light source.

12. The method according to claim 10, the method further comprising:
sending a test signal via the first light source and via the second light source-respectively;
receiving a response signal, which comprises a feedback on channel state information, CSI, derived from the test signal;
determining the difference in response time between the first light source and the second light source based on the response signal; and
compensating for the difference in response time by adding an extra delay to a signal path to the second light source according to the determined difference in response time.

13. A non-transitory computing computer readable medium comprising instructions, the instructions when executed by an optical wireless communication transmitter comprising a processor, cause the processor to perform the method of claim 10.

* * * * *